(12) United States Patent
Su et al.

(10) Patent No.: US 9,359,506 B1
(45) Date of Patent: Jun. 7, 2016

(54) ANTI-FOGGING, HEAT-INSULATING COATING COMPOSITION, METHOD FOR PREPARING THE SAME, AND FILM FORMED FROM THE SAME

(71) Applicant: Industrial Technology Research Institute, Chutung, Hsinchu County (TW)

(72) Inventors: Yu-Yang Su, Hsinchu County (TW); Pao-Tang Chung, Hsinchu County (TW); Chyi-Ming Leu, Hsinchu County (TW); Chun-Hsiang Wen, Hsinchu County (TW); Sung-Jeng Jong, Hsinchu County (TW)

(73) Assignee: Industrial Technology Research Institute, Chutung, Hsinchu County (TW)

( * ) Notice: Subject to any disclaimer, the term of this patent is extended or adjusted under 35 U.S.C. 154(b) by 20 days.

(21) Appl. No.: 14/582,588

(22) Filed: Dec. 24, 2014

(30) Foreign Application Priority Data

Dec. 4, 2014 (TW) .................................. 103142118

(51) Int. Cl.
| | | |
|---|---|---|
| *C09D 5/00* | (2006.01) | |
| *C09D 183/04* | (2006.01) | |
| *C09D 7/12* | (2006.01) | |
| *C08K 3/02* | (2006.01) | |
| *C08K 9/02* | (2006.01) | |

(52) U.S. Cl.
CPC ................ *C09D 5/00* (2013.01); *C09D 7/1216* (2013.01); *C09D 7/1225* (2013.01); *C09D 7/1266* (2013.01); *C09D 7/1275* (2013.01); *C09D 183/04* (2013.01); *C08K 9/02* (2013.01); *C08K 2003/023* (2013.01)

(58) Field of Classification Search
CPC ............ C09D 1/00; C09D 5/00; C09D 5/004; C09D 5/32; C09D 7/12; C09D 183/04; C09D 7/1225; C09D 7/1216; C09D 7/1266; C09D 7/1275; C09K 3/18; C01G 41/00; C08K 2003/2258; C08K 9/02; C08K 2003/023
See application file for complete search history.

(56) References Cited

U.S. PATENT DOCUMENTS

| | | | | |
|---|---|---|---|---|
| 8,969,458 | B2 * | 3/2015 | Chung ..................... | C08K 3/22 524/406 |
| 2012/0138842 | A1 * | 6/2012 | Fu .......................... | C01G 41/02 252/62 |
| 2014/0295175 | A1 * | 10/2014 | Kishikawa .............. | B32B 27/38 428/336 |

FOREIGN PATENT DOCUMENTS

| | | |
|---|---|---|
| CN | 1263544 A | 8/2000 |
| CN | 1555989 A | 12/2004 |
| CN | 102311234 A | 1/2012 |
| CN | 103304878 A | 9/2013 |
| CN | 103664003 A | 3/2014 |
| CN | 103818082 A | 5/2014 |
| SI | 22672 A | 6/2009 |
| TW | 201000320 A | 1/2010 |
| TW | 201224067 A | 6/2012 |
| TW | 201229161 A | 7/2012 |
| TW | 201420692 A | 6/2014 |
| WO | WO-03/091117 A1 | 11/2003 |
| WO | WO-2012/020981 A2 | 2/2012 |
| WO | WO 2013/059948 A1 * | 5/2013 |

OTHER PUBLICATIONS

Choi et al., "Improvement of uncooled infrared imaging detector by using mesoporous silica as a thermal isolation layer," *Ceramics Intl.*, 34:833-836 (2008).

Coquil et al., "Thermal conductivity of cubic and hexagonal mesoporous silica thin films," *J. Appl. Phys.*, 106:034910-1-034910-11 (2009).

Rahman et al., "Interference Pigment Coated Solar Cells for Use in High Radiant Flux Environments," *Jordan J. Mechan. Ind. Eng.*, 4(1):129-134 (2010).

Schmidt, "Multifunctional inorganic-organic composite sol-gel coatings for glass surfaces," *J. Non-Crystaline Solids*,178:302-312 (1994).

Xu and He, "Antifogging and Antireflection Coatings Fabricated by Integrating Solid and Mesoporous Silica Nanoparticles without any Post-Treatments," American Chem. Soc., *ACS Appl. Material Interfaces*, 4(6):3293-3299 (2012).

Yao and He, "Broadband Antireflective Superhydrophilic Thin Films with Outstanding Mechanical Stability on Glas Substrates," *Chin. J. Chem.*, 32(6):507-512 (2014).

CN 102311234 English abstract, (Jan. 2012).
CN 103304878 English abstract, (Sep. 2013).
CN 103664003 English abstract, (Mar. 2014).
CN 103818082 English abstract, (May 2014).
CN 1263544 English abstract, (Aug. 2000).
CN 1555989 English abstract, (Dec. 2004).

(Continued)

*Primary Examiner* — Anthony J Green

(74) *Attorney, Agent, or Firm* — McCarter & English, LLP; Yu Lu

(57) ABSTRACT

Provided is a coating composition having anti-fogging and heat-insulating functions, which includes a mesoporous material, an organic polysiloxane, and co-doped tungsten oxide as shown in formula (I), $$M_xWO_{3-y}A_y$$

wherein M is an alkali metal element, W is tungsten, O is oxygen, A is halogen, $0<x\le1$, and $0<y\le0.5$. Further provided are a method for preparing a coating composition having anti-fogging and heat-insulating functions and a film formed from the coating composition.

18 Claims, 1 Drawing Sheet

(56) References Cited

OTHER PUBLICATIONS

SI 22672 English abstract, (Jun. 2009).
TW 201000320 English abstract, (Jan. 2010).
TW 201229161 English abstract, (Jul. 2012).
WO 2003/091117 English abstract, (Nov. 2003).
WO 2012/020981 English abstract, (Feb. 2012).
TW 201224067 English abstract, (Jun. 2012).
TW 201420692 English abstract, (Jun. 2014).

* cited by examiner

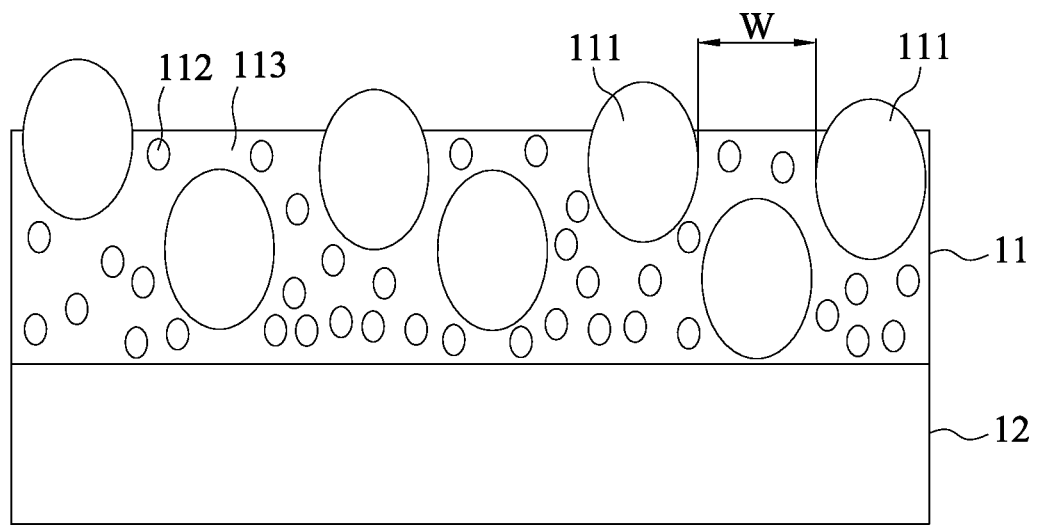

ANTI-FOGGING, HEAT-INSULATING COATING COMPOSITION, METHOD FOR PREPARING THE SAME, AND FILM FORMED FROM THE SAME

CROSS-REFERENCE TO RELATED APPLICATIONS

This application claims foreign priority under 35 U.S.C. §119(a) to Patent Application No. 103142118, filed on Dec. 4, 2014, in the Intellectual Property Office of Ministry of Economic Affairs, Republic of China (Taiwan, R.O.C.), the entire content of which Patent Application is incorporated herein by reference.

TECHNICAL FIELD

The present disclosure relates to coating compositions, films formed from the same, and methods for preparing the same, and, more particularly, to a coating composition having anti-fogging and heat-insulating functions, a film formed from the same, and a method for preparing the same.

BACKGROUND OF THE INVENTION

Most of the current heat-insulating films and heat-insulating glass for automobiles do not have an anti-fogging function. As a result, during a cold winter or a rainy season, the water vapors in the hot air inside an automobile forms fog droplets on the surface of the relatively colder glass. As such, the field of vision of a driver is affected, and a traffic accident might even occur. Electroautomobiles do not have the hot air from motors for defogging. In the case of fogging on the glass of an electroautomobile, air-conditioning is switched on for defogging. The extra electrical energy consumed by the air-conditioning would decrease the mileage. Moreover, the effect of the daily temperature difference causes the saturated water vapor inside an agricultural polyolefin shed film aggregate on the inner surface of the shed film to form water droplets, referred to as the "fogging phenomenon." The fogging phenomenon affects daylight irradiation, and the high humidity inside in the shed is likely to induce pest damages to crops.

Because of the chemical properties of heat-insulating and anti-fogging materials, such as hydrophilicity and hydrophobicity, it is difficult to evenly mix the two materials in a coating or a film-forming material. As a result, most of the heat-insulating films or heat-insulating glass does not have the anti-fogging function. In order to add the anti-fogging function to a heat-insulating film, multiple steps are used in the modern technology for preparation. For example, coating a fogproof material on a heat-insulating film or attaching an anti-fogging film. However, the temperature and time for curing a fogproof coating or the process for forming a multi-layered film structure not only increases the production cost, but also limits the product use due to lowered light transmittance.

Therefore, in order to resolve the above issues, one of the major objectives for developing the present disclosure is to develop a composite coating and a film-forming material having anti-fogging and heat-insulating functions, while maintaining high light transmittance.

SUMMARY OF THE INVENTION

Provided is a coating composition having anti-fogging and heat-insulating functions, which includes:
a mesoporous material;
co-doped tungsten oxide as shown in formula (I)

$$M_xWO_{3-y}A_y$$

wherein M is an alkali metal element, W is tungsten, O is oxygen, A is halogen, $0<x\leq1$, and $0<y\leq0.5$; and
organic polysiloxane.

Provided is a film having anti-fogging and heat-insulating functions, which includes: a matrix that is a continuous layer formed by organic polysiloxane; a plurality of mesoporous silicon particles dispersed in the matrix; and co-doped tungsten oxide, as shown in formula (I), embedded in the matrix and located between any two of the mesoporous silicon particles.

Provided is a method for preparing a coating composition having anti-fogging and heat-insulating functions, which includes the steps of: preparing a mesoporous material, co-doped tungsten oxide as shown in formula (I), and organic polysiloxane; and mixing the mesoporous material, the co-doped tungsten oxide as shown in formula (I), and the polysiloxane.

BRIEF DESCRIPTIONS OF THE DRAWING

FIG. 1 is a sectional view of a film having anti-fogging and heat-insulating functions according to the present disclosure.

DETAILED DESCRIPTION OF THE INVENTION

In order to make the above and other objectives, features and advantages of the present disclosure more readily conceivable, the following preferred embodiments are provided, along with the appended FIGURE, for more detailed descriptions. From the disclosure of the present specification, a person skilled in the art can conceive the other advantages and effects of the present disclosure. The present disclosure can also be implemented or applied by other different embodiments. Based on different aspects and applications, each of the details of the present disclosure can also be modified and altered in various ways, without departing from the spirit of the present disclosure. It should be understood that the following specific elements and arrangements are merely used for describing the present disclosure. Of course, these contents are merely used for exemplification, and not intended to limit the present disclosure.

Unless otherwise specified herein, the following terms used in the specification and the appended claims having the following meanings. Specifically, the singular forms "a," "an" and "the" include the plural forms. The terms "about" and "approximately" usually indicate a given value, or within 20%, preferably within 10%, and more preferably within 5% of a range; if a given amount is an approximate amount, it may imply the term "about" or "approximately" in a non-specified way. The term "mesoporous" indicates that the pore diameter of a pore is between 2 to 50 nm.

The present disclosure provides a composition having anti-fogging and heat-insulating functions, which includes:
a mesoporous material;
co-doped tungsten oxide as shown in formula (I)

$$M_xWO_{3-y}A_y$$

wherein M is an alkali metal element, W is tungsten, O is oxygen, A is halogen, $0<x\leq1$, and $0<y\leq0.5$; and
organic polysiloxane.

The present disclosure provides, a method for preparing a coating composition, which includes the steps of: preparing a mesoporous material, co-doped tungsten oxide as shown in formula (I), and organic polysiloxane; and mixing the mesoporous material, the co-doped tungsten oxide as shown in formula (I), and the organic polysiloxane. Specifically, the method includes preparing the mesoporous material by a sol-gel method; co-doping tungsten oxide with anions and cations; synthesizing the organic polysiloxane by hydrolysis; and blending the mesoporous material, the co-doped tungsten oxide and the organic polysiloxane, thereby forming the coating composition having anti-fogging and heat-insulating functions.

In the present disclosure, the mesoporous material can include a precursor, a surfactant, and mesoporous particles. The mesoporous material is prepared by synthesizing the precursor; and self-assembling micelles and nanoparticles formed by using the surfactant in a solvent, so as to make the nanoparticles form mesoporous particles each having a mesoporous structure; and then blending the precursor and the mesoporous particles.

Specifically, silane or siloxane (e.g., tetraethoxysilane (TEOS), tetramethoxysilane (TMOS)), and a non-ionic surfactant (e.g., a surfactant with a ethylene oxide-propylene oxide-ethylene oxide triblock copolymer (e.g., P123 (HO(CH$_2$CH$_2$O)$_{20}$(CH$_2$CH(CH$_3$)O)$_{70}$(CH$_2$CH$_2$O)$_{20}$H) and F127 (HO(CH$_2$CH$_2$O)$_{106}$(CH$_2$CH(CH$_3$)O)$_{70}$(CH$_2$CH$_2$O)$_{106}$H)) can be selected to synthesize a precursor. The precursor is an inorganic porous macromolecule, such as inorganic polysiloxane or polysilane. In an embodiment, the precursor is prepared by the following steps of: evenly mixing siloxane and a solvent (e.g., ethanol, water, and hydrochloric acid) to produce a siloxane solution; evenly mixing a surfactant with a triblock copolymer and a solvent (e.g., ethanol) to produce a surfactant solution; thoroughly mixing the siloxane solution and the surfactant solution; and then setting at room temperature to allow Si—OR of the siloxane molecules to stepwisely hydrolyze to generate Si—OH, and the siloxane molecules polymerize to form the precursor by dehydrating hydroxyl groups or undergoing dealcoholization. In an embodiment, the inorganic polysiloxane molecule can retain hydroxyl groups as surface functional groups, by controlling the pH value, temperature, and time for the reaction.

A cationic surfactant can be selected as a template for preparing mesoporous particles. In an embodiment, the mesoporous particles are prepared by the following steps of: dissolving a cationic surfactant, cetrimonium bromide (CTABr), in polyoxyethylene-8-octyl-phenylether (Trinton-X-100) and concentrated hydrochloric acid to form a surfactant solution, wherein CTABr can form micelles in the solution; adding nanoparticles (e.g., nano silicon particles of silica) to the surfactant solution; setting after stirring to allow the nanoparticles to self-assemble on a template; washing with ionic water/ethanol several times; and then removing the template to obtain the mesoporous particles. In an embodiment, the mesoporous particles required by the present disclosure can be controlled by the selection of the surfactant used (i.e., the arrangement of the template) and the adjustment of the reaction conditions such as pH value, temperature, and time for the self-assembling reaction. For example, the size of the particle diameter of the mesoporous particle can be greater than about 50 nm, such as greater than about 100 nm, such as between 200 nm to 1000 nm, and the specific surface area of a mesoporous particle can be greater than about 800 cm$^2$/g.

Moreover, a tungsten oxide co-doped with anions and cations is prepared by the steps of: adding an alkali metal salt and a halogen salt at appropriate proportions during the process for synthesizing tungsten oxide; and heating the mixture from 300° C. to 800° C. in a hydrogen reduction environment, thereby obtaining the co-doped tungsten oxide powder having a chemical structure of $M_xWO_{3-y}A_y$, wherein M is an alkali metal element, W is tungsten, O is oxygen, A is halogen, $0<x\leq1$, and $0<y\leq0.5$.

More specifically, the precursor for synthesizing tungsten oxide can be selected from ammonium metatungstate, ammonium orthotungstate, ammonium paratungstate, alkali metal tungstate, tungstic acid, tungsten silicide, tungsten sulfide, tungsten oxychloride, tungsten alkoxide, tungsten hexachloride, tungsten tetrachloride, tungsten bromide, tungsten fluoride, tungsten carbide, carbon tungsten oxide, or other salts containing tungsten. The alkali metal salts can be selected from at least one of alkali metal carbonate, alkali metal bicarbonate, alkali metal nitrate, alkali metal nitrite, alkali metal hydroxide, alkali metal halogenated salt, alkali metal sulfate, alkali metal sulfite, and other alkali metal-containing salts. The halogenated salt can be selected from halogenated amine, organic ammonium salts, halogenated carbon, halogenated hydrogen, halogenated tungsten, halogenated benzene, halogenated aromatic group, halogenated alkane, or other halogen-containing salts. The preparation and characteristics of the above tungsten oxide co-doped with anions and cations can be referred to TW 1402218, which is a patent owned by the Applicant, the entirely of which is incorporated by reference herein.

After the co-doped tungsten oxide is obtained, it can be subjected to a grinding process, in order to control the size of the particle diameter of the co-doped tungsten oxide required by the present disclosure. The particle diameter of the co-doped tungsten oxide can be no more than 100 nm, such as between 50 to 100 nm, such as between 60 to 80 nm. During the above grinding process, a small amount of inorganic metal oxide, such as silica and/or titanium oxide and/or aluminum oxide and/or zirconium oxide is added, and the inorganic metal oxide is wrapped around the outer surface of the co-doped tungsten oxide, so as to avoid aggregation and the change in the surface characteristics of the particles of co-doped tungsten oxide. Further, a small amount of silane, tilane or organic metal groups can also be added to modify the surface properties of the co-doped tungsten oxide, so as to increase the dispersibility of the co-doped tungsten oxide in an organic solvent or a polymer and the compatibility of the co-doped tungsten oxide with an organic solvent or a polymer.

Moreover, the process of synthesizing an organic polysiloxane by hydrolysis includes the steps of providing a siloxane monomer (e.g., 3-(2,3-glycidoxy)propyltrimethoxysilane or vinyltrimethoxysilane), wherein siloxane monomer includes at least one functional group selected from a vinyl group, an acrylic acid group, and an ethoxy group; dissolving the siloxane monomer in an acidic solvent (e.g., hydrochloric acid aqueous solution), wherein the pH value of the reaction solution is from 1 to 5, the reaction temperature is from 10° C. to 40° C., and the reaction time is from 0.5 to 5 hours; and conducting hydrolysis-polymerization at room temperature while stirring. After completion of the reaction, distillation is conducted at a reduced pressure to extra additional solvent, and thereby obtaining the organic polysiloxane.

After the mesoporous material, co-doped tungsten oxide and organic polysiloxane are prepared, the mesoporous material and co-doped tungsten oxide with appropriate particle diameters are screened for and selected, wherein the ratio of the particle diameter of a mesoporous particle (e.g., a mesoporous silicon particle) to that of the co-doped tungsten oxide can be from 20:1 to 1:1, such as from 20:1 to 2:1, such as from 16:1 to 2:1. The mesoporous material, the co-doped tungsten oxide and the organic polysiloxane are blended in an appropriate weight ratio ranging, for example, from 42.5:57:0.5 to 8.5:76.5:15, so as to make the mesoporous material and the co-doped tungsten oxide to evenly disperse in the organic polysiloxane. As a result, a coating composition having anti-fogging and heat-insulating functions is obtained.

The present disclosure further provides a film having anti-fogging and heat-insulating functions. FIG. 1 is a schematic sectional view of a film according to the present disclosure. As shown in FIG. 1, a film 1 having anti-fogging and anti-insulating functions includes a transparent layer 11 having anti-fogging and insulating functions formed on a substrate 12. The substrate 12 can be glass or plastic. The plastic can be selected from, but not limited to, polyethylene (PE), polyethylene terephthalate (PET), polyimide, etc.

As shown in FIG. 1, the transparent layer 11 can be constituted by a matrix 113, a plurality of mesoporous silicon particles 111, and co-doped tungsten oxide 112 as shown in formula (1). In an embodiment, the matrix 113 is a continuous layer formed by organic polysiloxane, the mesoporous silicon particles 111 are dispersed in the matrix 113, any two of the mesoporous silicon particles 111 are spaced apart, and the co-doped tungsten oxide 112 is embedded in the matrix 113, and located between any two of the mesoporous silicon particles 111.

In an embodiment, the matrix 113 can further includes a precursor, a surfactant, and the like. The precursor is an inorganic polysilane or polysiloxane molecule having a hydrophilic group, which can increase the hydrophilicity of the transparent layer 11. Organic polysiloxane provides adhesion and support, such that it can effectively improve the film formation and thickness of the transparent layer 11. The thickness of the transparent layer 11 can be about 0.1 μm or higher, such as about 1 μm or higher, such as from 1 to 50 μm. Moreover, the surfaces of the mesoporous silicon particles 111 also have hydrophilic groups. The affinity between the matrix 113 and each of the mesoporous silicon particles 111 allow any two of the mesoporous silicon particles 111 to be dispersed in the matrix 113 in a way that they are spaced part. The width W of the spacing parallel to a surface of the matrix 113 can be greater than about 50 nm. In another embodiment, the spacing on a surface parallel to a surface of the matrix can be no more than 50 nm. The co-doped tungsten oxide 112 has a structure of $M_xWO_{3-y}A_y$, wherein M is a metal alkali element, W is tungsten oxide, O is oxygen, A is halogen, $0<x\leq1$, and $0<y\leq0.5$. The particle diameter of a mesoporous silicon particle 111 can be from 50 to 1000 nm. The specific surface area of a mesoporous silicon particle can be greater than 800 $cm^2/g$. The particle diameter of the co-doped tungsten oxide 112 can be from 50 to 100 nm. In order to fill the co-doped tungsten oxide 112 in the space among the plurality of mesoporous particles 111, the ratio of the particle diameter of the mesoporous silicon particle 111 to that of the co-doped tungsten oxide 112 can be from 20:1 to 1:1, such as from 20:1 to 2:1, such as from 16:1 to 2:1.

In an embodiment, as the mesoporous silicon particles 111 and the co-doped tungsten oxide 112 in an appropriate ratio of particle diameter is selected in the present disclosure, the apexes of a portion of the mesoporous silicon particles 111 protrude from a surface of the matrix 113. The hydrophilic groups on the surfaces of the mesoporous silicon particles 111 and the matrix 113 can cause the contact angle of a water molecule on a surface of the transparent layer 111 to rapidly decrease to 0° from 10°, so that the film 1 imparts an anti-fogging effect. Further, the alkali metal and the halogenated co-doped tungsten oxide 112 have high conductivity, such that 74% or more of the infrared ray with a wavelength of 800 nm or higher can be effectively blocked. Hence, the film 1 has a heat-insulating function for blocking infrared ray, while maintaining the transmittance of visible light to 60%, or even 80% or higher.

In the present disclosure further provided is a method for preparing a film having anti-fogging and heat-insulating functions. The method includes the steps of coating the coating composition described above in the present disclosure on a substrate; and drying the coating composition to form a transparent film on a surface of the substrate.

In an embodiment of the present disclosure, the mesoporous material, the co-doped tungsten oxide and the organic polysiloxane in the coating composition are in a weight ratio ranging from 42.5:57:0.5 to 8.5:76.5:15. The thickness of the coating can be from 0.1 to 50 μm. In an embodiment, the coating composition according to the present disclosure can be dried at a lower temperature (such as no higher than 100° C., such as can be no higher than 60° C.) to remove the solvent and/or surfactant, and thereby forming a transparent layer having anti-fogging and heat-insulating functions on the substrate.

The followings specifically exemplify the coating compositions in the examples and the weight proportion (%) of each of the ingredients in the comparative examples in the present disclosure, wherein the precursor solution was prepared by dissolving inorganic polysiloxane prepared from tetraethoxysilane in a solution of ethanol and water, and the solid ingredient of the inorganic polysiloxane can be about 10%; the mesoporous silicon particles were solids; the co-doped tungsten oxide solution was prepared by dissolving the co-doped tungsten oxide in a toluene solution, and the solid ingredient of the co-doped tungsten oxide was about 20%; the polysiloxane solution was prepared by dissolving organic polysiloxane prepared from 3-(2,3-glycidoxy)propyltrimethoxysilane in a solution of ethanol and water, and the solid ingredient of the organic polysiloxane is about 75%.

| Coating composition example 1 | |
|---|---|
| Precursor solution | 38.02% |
| Mesoporous silicon particles | 0.18% |
| Co-doped tungsten oxide solution | 57.03% |
| Organic polysiloxane solution | 4.77% |
| Coating composition example 2 | |
| Precursor solution | 18.99% |
| Mesoporous silicon particles | 0.32% |
| Co-doped tungsten oxide solution | 75.94% |
| Organic polysiloxane solution | 4.75% |
| Coating composition example 3 | |
| Precursor solution | 18.96% |
| Mesoporous silicon particles | 0.45% |
| Co-doped tungsten oxide solution | 75.85% |
| Organic polysiloxane solution | 4.74% |
| Comparative example 1 | |
| Precursor solution | 90.78% |
| Mesoporous silicon particles | 0.57% |
| Organic polysiloxane solution | 9.13% |
| Comparative example 2 | |
| Precursor solution | 57.14% |
| Mesoporous silicon particles | 38.10% |
| Organic polysiloxane solution | 4.76% |

-continued

| Comparative example 3 | |
|---|---|
| Precursor solution | 89.47% |
| Mesoporous silicon particles | 0.10% |
| Organic polysiloxane solution | 1.88% |

| Comparative example 4 | |
|---|---|
| Co-doped tungsten oxide solution | 100% |

The phenomenon of the particle aggregation and precipitation (i.e., gelling) occurred shortly in comparative examples 1 and 2 after blending, such that the products have a storage problem and cannot form continuous coatings. Although a portion of particles aggregated in examples 1 and 3 after a longer period of time, the effect of use was not affected. It is clear that the unique design of the compositional ratio of each of the ingredients can allow a mixture to be stable.

Each of the compositions in coating composition examples 1-3 and comparative examples 3 and 4 was coated on a transparent glass, and dried to form film examples 1-3, an anti-fogging film of comparative example 3, and heat-insulating film of comparative film 4. A Fourier transform infrared spectroscopy (FTIR) was used to measure the weight ratios of the ingredients of film examples 1-3, and the results of the measurements are shown in Table 1. The contact angles of water on film examples 1-3, the anti-fogging film of comparative example 3, and the heat-insulating film of comparative example 4 were measured. The transmittance of visible light and blockage of infrared ray were measured with a visible ray spectrometer (UV-VIS) and FTIR, respectively. The results of the measurements are shown in Table 2.

TABLE 1

| Weight ratio of ingredient | Film example 1 | Film example 2 | Film example 3 |
|---|---|---|---|
| Precursor | 20.06% | 9.06% | 9.0% |
| Mesoporous silicon particle | 0.94% | 1.55% | 2.12% |
| Co-doped tungsten oxide | 60.17% | 72.41% | 72.01% |
| Organic polysiloxane | 18.83% | 16.98% | 16.87% |

TABLE 2

| | Film example 1 | Film example 2 | Film example 3 | Comparative example 3 | Comparative example 4 |
|---|---|---|---|---|---|
| Contact angle of water | 8.7 to 0 | 9.6 to 0 | 7.0 to 0 | 7.4 | 89.6 |
| Visible light transmittance (%) | 80 | 74 | 60 | 91 | 69 |
| Blockage of infrared ray (%) | 74 | 84 | 97 | 11 | 94 |

From the above, the coating composition according to the present disclosure includes a mesoporous material, co-doped tungsten oxide and organic polysiloxane, wherein the mesoporous material has an anti-fogging effect, and the co-doped tungsten oxide has an heat insulating effect from blocking infrared ray. As such, the coating composition according to the present disclosure has a composite effect of anti-fogging and heat insulation. In an embodiment of the present disclosure, the mesoporous silicon particles and the co-doped tungsten oxide are successfully combined at uniquely designed compositional ratio, so as to make the formed film impart excellent hydrophilicity, transmittance of visible light transmittance, and blockage of infrared ray. Hence, the coating composition is suitable for use in the automobile, architectural and agricultural industries, for achieving the effects of energy conservation, heat insulation and anti-fogging.

The above examples are provided only to illustrate the principle and effect of the present disclosure, and they do not limit the scope of the present disclosure. One skilled in the art should understand that, modifications and alterations can be made to the above examples, without departing from the spirit and scope of the present disclosure. Therefore, the scopes of the present disclosure should be accorded to the disclosure of the appended claims.

The invention claimed is:

1. A coating composition having anti-fogging and heat-insulating functions, comprising:
   a mesoporous material;
   a co-doped tungsten oxide as shown in formula (I)

$$M_xWO_{3-y}A_y \quad (I)$$

wherein M is an alkali metal element, W is tungsten, O is oxygen, A is halogen, $0<x\leq 1$, and $0<y\leq 0.5$; and
   an organic polysiloxane.

2. The coating composition of claim 1, wherein the mesoporous material comprises a precursor, a surfactant, and a mesoporous silicon particle.

3. The coating composition of claim 2, wherein the mesoporous silicon particle has a specific surface area greater than 800 $cm^2/g$.

4. The coating composition of claim 2, wherein the co-doped tungsten oxide is powder, and a ratio of a particle diameter of the mesoporous silicon particle to a particle diameter of the co-doped tungsten oxide is from 20:1 to 1:1.

5. The coating composition of claim 1, wherein the organic polysiloxane has at least one functional group selected from the group consisting of a vinyl group, an acrylic acid group, and an epoxy group.

6. The coating composition of claim 1, wherein the mesoporous material, the co-doped tungsten oxide and the organic polysiloxane are in a weight ratio ranging from 42.5:57:0.5 to 8.5:76.5:15.

7. A film having anti-fogging and heat-insulating functions, comprising:
   a matrix that is a continuous layer formed from organic polysiloxane;
   a plurality of mesoporous silicon particles dispersed in the matrix; and
   a co-doped tungsten oxide, as shown in formula (I), embedded in the matrix and located between any two of the mesoporous silicon particles, $$M_xWO_{3-y}A_y \quad (I)$$

wherein M is an alkali metal element, W is tungsten, O is oxygen, A is halogen, $0<x\leq 1$, and $0<y\leq 0.5$.

8. The film of claim 7, wherein each of the mesoporous silicon particles has a particle diameter ranging from 50 to 1000 nm.

9. The film of claim 7, wherein the co-doped tungsten oxide is powder, and the powder has a particle diameter ranging from 50 to 100 nm.

10. The film of claim 7, wherein a ratio of a particle diameter of each of the mesoporous silicon particles to a particle diameter of the co-doped tungsten oxide is from 20:1 to 1:1.

11. The film of claim 7, wherein apexes of a portion of the mesoporous silicon particles protrude from a surface of the matrix.

12. The film of claim 7, which has a water contact angle less than 10°.

13. A method for preparing a coating composition having anti-fogging and heat-insulating functions, comprising:
preparing a mesoporous material, an organic polysiloxane, and a co-doped tungsten oxide as shown in formula (I), $$M_xWO_{3-y}A_y \quad (I)$$

wherein M is an alkali metal element, W is tungsten, O is oxygen, A is halogen, $0<x\leq 1$, and $0<y\leq 0.5$; and
mixing the mesoporous material, the organic polysiloxane, and the co-doped tungsten oxide as shown in formula (I).

14. The method of claim 13, wherein the mesoporous material comprises a precursor, a surfactant, and a mesoporous silicon particle.

15. The method of claim 14, wherein the mesoporous silicon particle has a specific surface area greater than 800 cm$^2$/g.

16. The method of claim 14, wherein a ratio of a particle diameter of the mesoporous silicon particle to a particle diameter of the co-doped tungsten oxide is from 20:1 to 1:1.

17. The method of claim 13, wherein the organic polysiloxane has at least one functional group selected from the group consisting of a vinyl group, an acrylic acid group and an epoxy group.

18. The method of claim 13, wherein the mesoporous material, the co-doped tungsten oxide and the organic polysiloxane are in a weight ratio ranging from 42.5:57:0.5 to 8.5:76.5:15.

* * * * *